United States Patent [19]

Yamashita

[11] Patent Number: 5,036,507
[45] Date of Patent: Jul. 30, 1991

[54] TILTING MECHANISM FOR OPTICAL PICKUP UNIT

[75] Inventor: Masakazu Yamashita, Saitama, Japan

[73] Assignee: Pioneer Electronic Corporation, Tokyo, Japan

[21] Appl. No.: 430,536

[22] Filed: Nov. 1, 1989

[30] Foreign Application Priority Data

Mar. 9, 1989 [JP] Japan ................. 1-26125[U]

[51] Int. Cl.⁵ .................... G11B 7/00; G11B 21/00
[52] U.S. Cl. ................ 369/44.32; 369/44.11; 369/215
[58] Field of Search ........... 369/244, 251, 256, 44.14, 369/44.32

[56] References Cited

U.S. PATENT DOCUMENTS 4,694,442 9/1987 Gijzen et al. .............. 369/44.32
4,829,508 5/1989 Arita ........................ 369/244

Primary Examiner—David Trafton
Assistant Examiner—Michelle S. Irvine
Attorney, Agent, or Firm—Sughrue, Mion, Zinn, Macpeak & Seas

[57] ABSTRACT

A tilting mechanism for the optical pickup unit of an optical information record/playback apparatus such as a video disk player. The optical pickup and a support member for slidably supporting the pickup are tilted together by a tilting servocontrol. The tilting mechanism includes a movable fulcrum about which the optical pickup and the support member are tilted. The fulcrum is moved depending on the position of the optical pickup or on a focusing error signal, so that the tilting servo-control is performed when the fulcrum is in an appropriate position with respect to the distance between the pickup and the disk.

5 Claims, 2 Drawing Sheets

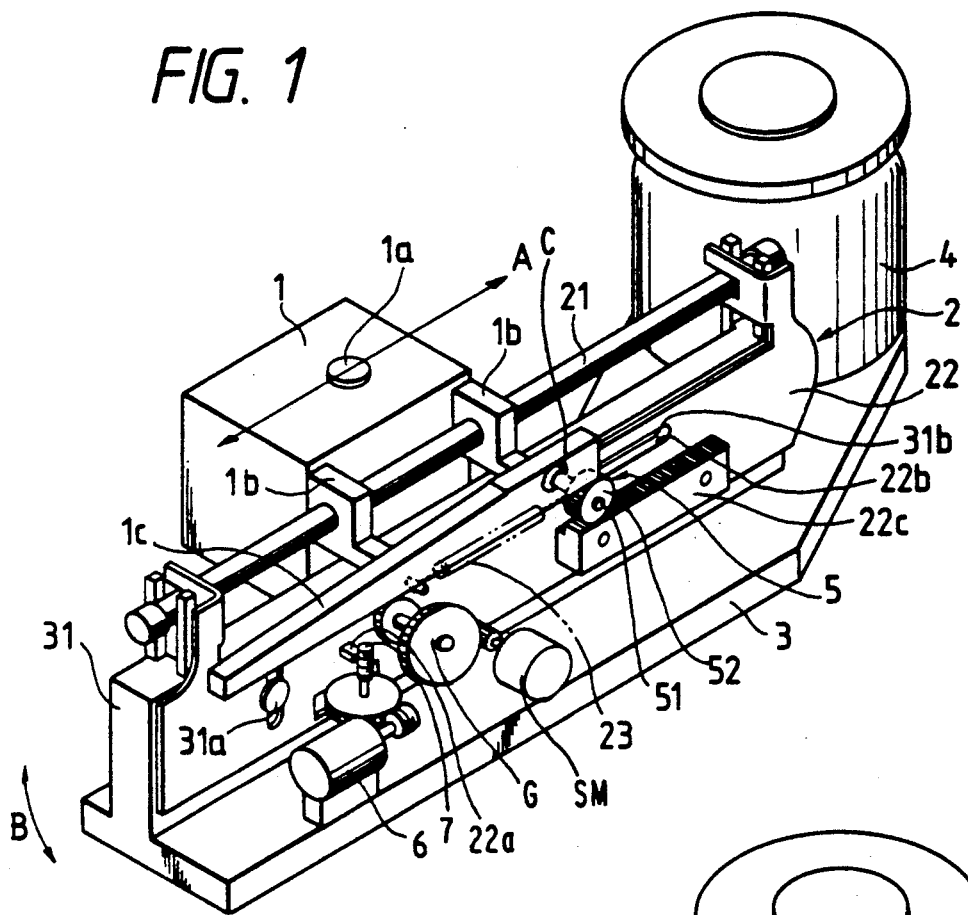
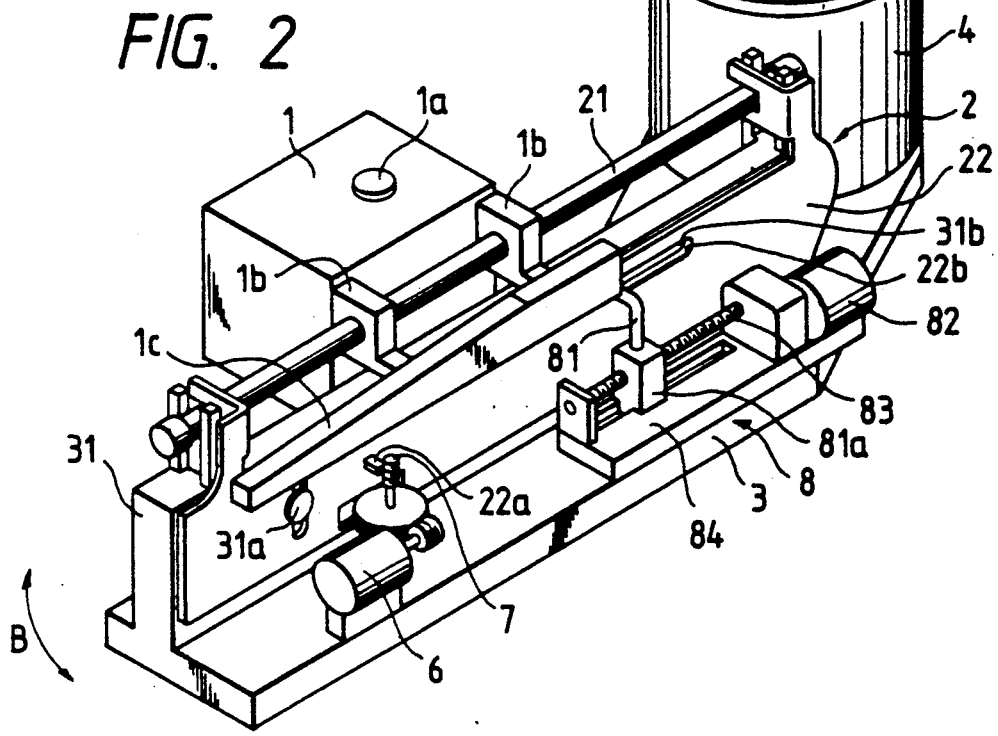

DISK CENTER

TILTING MECHANISM FOR OPTICAL PICKUP UNIT

BACKGROUND OF THE INVENTION

The present invention relates to a tilting mechanism for the optical pickup unit of an optical information record/playback apparatus such as a video disk player.

The angle of irradiation of laser light upon the surface of a disk and the focusing of the laser light onto the surface of the disk need to be accurately controlled during the reading of information from the disk by an optical information record/ playback apparatus or the like. However, since the disk warps due to its own weight when placed on the apparatus so that the peripheral portion of the disk sags the angle of irradiation of the laser light and the focusing thereof cannot be accurately controlled simply by horizontally moving the optical pickup of the apparatus in the radial direction of the disk. Therefore, a conventional tilting mechanism, as shown in FIG. 5, is provided for the optical pickup unit of the apparatus.

As shown in FIG. 5, the optical pickup unit has a support member 30 for supporting a sliding shaft 30a at both the ends thereof. The support member 30 is borne at a fulcrum 0 on a base 20 on which a spindle motor 10 is mounted. The optical pickup 40 of the pickup unit is supported on the sliding shaft 30a so that the pickup can be slid in the radial direction of the disk 50 as shown by double headed arrow A in FIG. 5.

When the disk 50 is placed on the spindle motor 10, the distance between the surface of the disk and the base 20 decreases toward the peripheral edge of the disk. In other words, the peripheral portion of the disk 50 inclines or sags toward the base 20. Thus, the angle of the disk 50 to the pickup 40 is detected by an angle sensor attached to the pickup, to perform tilting servocontrol to gradually tilt the support member 30 toward the base 20 as the pickup is slid on the sliding shaft 30a toward the peripheral edge of the disk. The angle of the disk 50 to the pickup 40 is thus kept zero. At the same time, the distance between the disk 50 and the pickup 40 is kept nearly constant. The error in the distance, which takes place because the correction of the angle of the disk 50 to the pickup 40 is performed with priority over the correction of the distance between them, is corrected by a focusing servocontrol based on a focusing error signal. Therefore, a focusing actuator for moving an objective lens has a greater load if the error in the distance is larger.

When the pickup 40 is located between the fulcrum 0 of the support member 30 and the center of the disk 50 as shown by P in FIG. 5, the distance between the pickup 40 and the disk 50 is decreased as the pickup is tilted by the tilting servocontrol so as to improve the angle of the disk to the pickup. Thus, the focusing actuator has a still greater load to such an extent that the apparatus cannot perform playback from the disk 50 if the capacity of the focusing actuator is small.

Since the correlation between the angle of each of many disks to the pickup 40 and the distance between each of the disks and the pickup is examined to predetermine the position of the fulcrum 0 of the conventional tilting mechanism to substantially, accurately control the angle and the distance for a typical disk, it is likely that the focusing actuator cannot follow-up a disk which causes an improper correlation such as a disk that is warped in the central portion thereof as shown in FIG. 6. Therefore, the apparatus cannot perform playback from such a warped disk.

SUMMARY OF THE INVENTION

The present invention was made in order to solve the above-mentioned problems of the conventional tilting mechanism.

Accordingly, it is an object of the present invention to provide a tilting mechanism for an optical pickup unit, in which an optical pickup and a support means for supporting the pickup are tilted together by a tilting servocontrol so that the angle of the pickup to the surface of a disk and the distance between the pickup and the disk are corrected; and the tilting servocontrol is performed so that the load on a focusing actuator is reduced. The fulcrum about which the optical pickup and the support means are tilted together is a movable fulcrum. The fulcrum is moved depending on the position of the optical pickup or on a focusing error signal, so that the tilting servocontrol is performed when the fulcrum is in an appropriate position with respect to the distance between the pickup and the disk. Therefore, the tilting control is performed in such a manner that the load on the focusing actuator is reduced. Further, if the stroke of the focusing actuator is small or the disk is an undesirable one with respect to the angle and distance between the optical pickup and the disk, e.g., the disk is warped the focusing actuator is caused to follow-up the disk and thus correct the distance.

BRIEF DESCRIPTION OF THE DRAWINGS

FIG. 1 is a perspective view of an optical pickup unit provided with a tilting mechanism according to an embodiment of the present invention;

FIG. 2 is a perspective view of an optical pickup unit provided with a tilting mechanism according to another embodiment of the present invention;

DETAILED DESCRIPTION OF THE PREFERRED EMBODIMENTS

Figure 3:
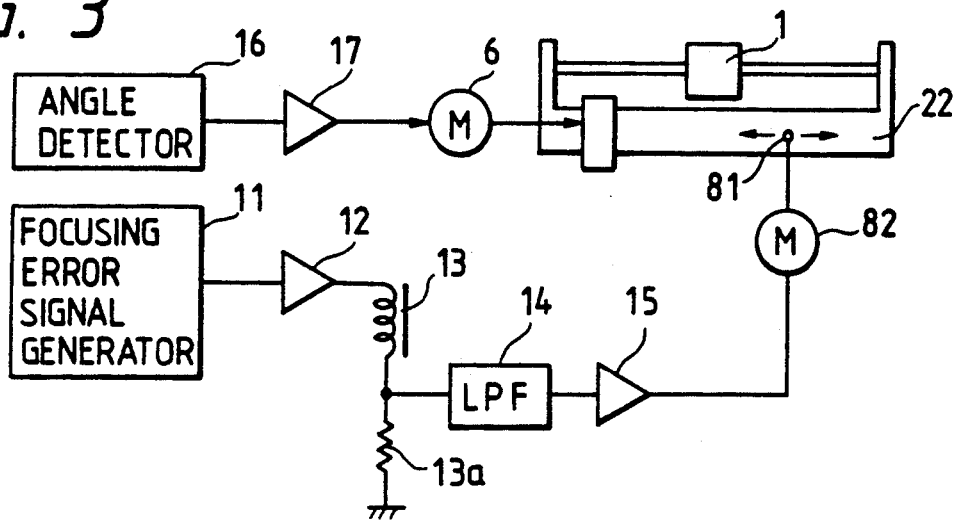
FIG. 3 is a block diagram of a servocontroller according to a still further embodiment of the present invention.

Embodiments of the present invention are hereinafter described in detail with reference to the drawings attached hereto.

FIG. 1 shows an optical pickup unit provided with a tilting mechanism according to one of the embodiments. As shown in FIG. 1, the playback apparatus includes an optical pickup 1, a pickup support means 2, a base 3, and a spindle motor 4 for rotating a disk. The optical pickup 1 is moved in parallel with the longitudinal direction of the pickup support means 2 so that the objective lens 1a of the pickup is moved in the radial direction of the disk, which extends through the axis of the spindle motor 4, as shown by double headed arrow A in FIG. 1. The pickup support means 2 has a sliding shaft 21 supported at both the ends thereof by a rocking plate 22. The shaft 21 is fitted in the sliding arms 1b of the pickup 1. The rocking plate 22 is supported by a movable fulcrum means 5 provided between nearly the center of the rocking plate and the spindle motor 4. A position restricting pin 31a prevents the rocking plate 22 from moving, along the longitudinal direction of the sliding shaft 21, relative to a vertical board 31 extending from the base 3. A tilting rack 22a is attached to the rocking plate 22 and engaged with a worm 7, which is rotated by a tilting motor 6 so that the rocking plate rocks about a fulcrum constituted by the movable fulcrum means 5 as shown by double headed arrow B in FIG. 1.

The movable fulcrum means 5 comprises a support pin 51, retained by a retaining member C, and a pinion 52 attached thereto at one end of the pin. The support pin 51 is fitted in the slender hole or slot 31b of the vertical board 31 and a slender hole or slot 22b of the rocking plate 22, and urged outwardly as to the radial direction of the disk by a spring 23. A fixed rack 22c is attached to the rocking plate 22 under the slender hole 22b thereof and engaged with the pinion 52, and extends in parallel with the slender hole.

A movable rack 1c for moving the optical pickup 1 along the sliding shaft 21 is attached to the sliding arm 1b of the pickup in such a manner that the toothed side of the movable rack faces down and is engaged with a gear G rotated by a slider motor SM. The pickup 1 is moved along the sliding shaft 21 through the rotation of the gear G. The height of the toothed side of the movable rack 1c is equal to that of the top of the pinion 52 so that when the pickup 1 is located between the substantial center of the length of the sliding shaft 21 and the spindle motor 4, the movable rack is engaged with the pinion 52 which in turn is engaged with the fixed rack 22c.

When the optical pickup 1 is located between the substantial center of the length of the sliding shaft 21 and the peripheral edge of the disk so that the movable rack 1c is not engaged with the pinion 52, the support pin 51 is held at the outer end—as to the radial direction of the disk—of the slender hole 22b of the rocking plate 22 by the spring 23. Thus, the rocking plate rocks about the fulcrum constituted by the support pin.

When the pickup 1 is located between the substantial center of the length of the sliding shaft 21 and the spindle motor 4 so that the movable rack 1c is engaged with the pinion 52, the position of the support pin 51 is changed depending upon the position of the pickup. For example, when the pickup 1 is moved past the center of the length of the sliding shaft 21 inwardly as to the radial direction of the disk so that the movable rack 1c is engaged with the pinion 52 the support pin 51 is moved inwardly as to the radial direction of the disk in such a manner that the length of the movement of the pin is equal to one half of the movement of the pickup. In that case the rocking plate 22 rocks about the fulcrum constituted by the support pin 51 moved within the slender hole 22b of the plate.

Hence, tilting servocontrol for tilting the optical pickup 1 about the fulcrum, which is constituted by the support pin 51 moved further inward as to the radial direction of the disk than the pickup which is moved past the center of the length of the sliding shaft 21 inwardly in the radial direction of the disk, is thus performed to correct the angle of the pickup to the surface of the disk without adversely affecting the focusing servocontrol which is for correcting the distance between the pickup and the disk. Therefore, the load on an actuator for performing the focusing servocontrol is reduced.

Although the length of the movement of the support pin 51 is equal to one-half of the movement of the optical pickup 1, the present invention is not confined thereto, but may be otherwise embodied so that a speed reduction ratio is predetermined for the pinion 52 so as to preset an optional relationship between the length of the movement of the support pin and the movement of the pickup.

FIG. 2 shows an optical pickup unit provided with a tilting mechanism according to another embodiment. Like portions of the optical pickup units shown in FIGS. 1 and 2 are denoted by the same reference symbols therein and are thus not described in detail hereinafter.

The rocking plate 22 of the tilting mechanism, as shown in FIG. 2, is supported by a movable fulcrum means 8 whose support pin 81 is fitted in the slender hole 22b of the rocking plate. A nut 81a is coupled to the support pin 81 and engaged with a feed screw shaft 83 coupled to a motor 82 which is for moving the movable fulcrum means 8. The nut 81a is slid on a guide plate 84 secured together with the motor 82 to a base 3. The support pin 81 is moved in the longitudinal direction of the slender hole 22b of the rocking plate 22 by the rotation of the motor 82. The position of the support pin 81 is detected by a potentiometer (not shown), so that the pin is moved to a predetermined position depending on the position of the optical pickup 1 of the optical pickup unit in the radial direction of a disk. The position of the pickup 1, in the radial direction of the disk, is detected in terms of the mechanical state of a drive mechanism for the pickup, track information recorded on the disk, or the like.

FIG. 3 shows a servocontroller according to a still further embodiment and is for an optical pickup unit provided with such a fulcrum moving mechanism as that of the optical pickup unit shown in FIG. 2. The application of the servocontroller of FIG. 3 to the optical pickup unit shown in FIG. 2 will now be described. The servocontroller includes a focusing error signal generator 11, a servo amplifier 12, an actuator 13, a current detection element 13a, a low-pass filter 14, a drive amplifier 15, an angle detector 16, and a tilting servo amplifier 17. The actuator 13 is for moving an objective lens 1a. A focusing error signal sent out from the focusing error signal generator 11 is amplified by the servo amplifier 12 which sends out a drive current to the actuator 13 built in the optical pickup 1. The DC component of the actuator drive current flowing through the junction of the actuator 13 and the current detection element 13a. which is grounded at one terminal thereof, is extracted by the low-pass filter 14 and then supplied to the drive amplifier 15 which amplifies the DC component so that the amplified DC component is supplied to the fulcrum moving motor 82. The angle detector 16 detects the angle of the optical pickup 1 to the disk so as to send out an angle error signal to the tilting servo amplifier 17 which amplifies the signal so that the amplifier sends out a drive current to the tilting motor 6 of the tilting mechanism. Tilting servocontrol is thus performed.

Figure 4:
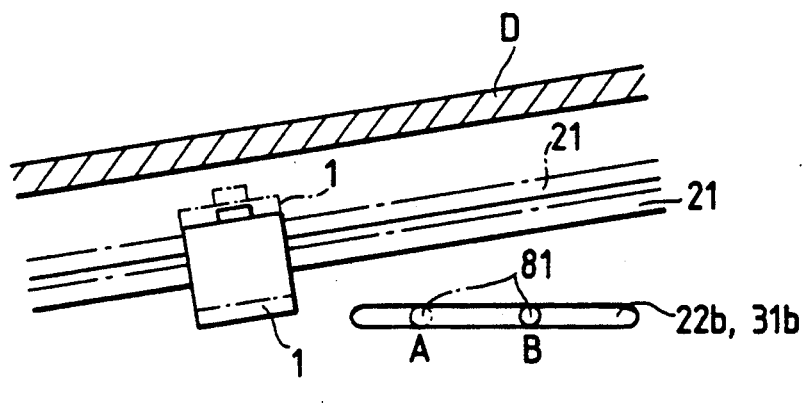
FIG. 4 is an explanatory view illustrating an example of correcting the distance between an optical unit and a disk by using the servocontroller.
Figure 5:
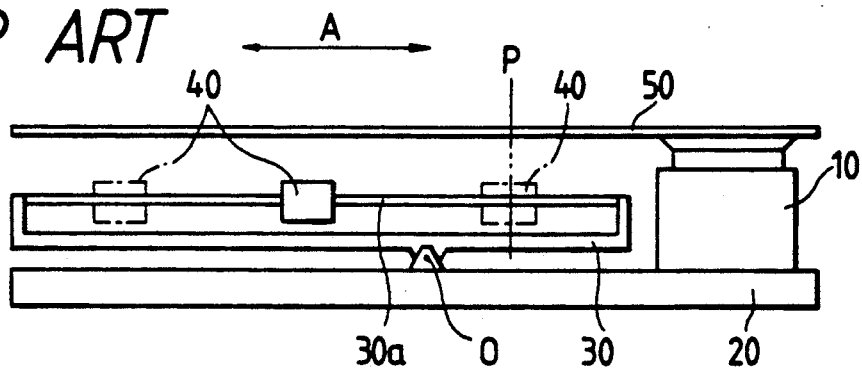
FIG. 5 is a front view of an optical pickup unit provided with a conventional tilting mechanism.
Figure 6:
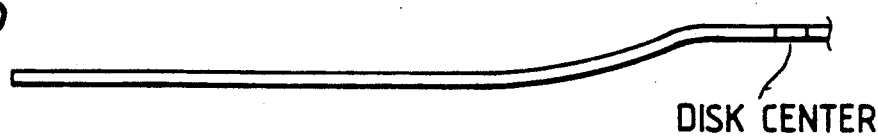
FIG. 6 is a view of a disk that is warped in the central portion thereof.

The polarity of a current to be supplied to the fulcrum moving motor 82 is predetermined to move the support pin 81 in such a direction as to correct the displacement of the optical pickup 1, which is caused by the tilting servocontrol. For example, when the sliding shaft 21 of the optical pickup unit is tilted by the tilting servocontrol so that the sliding shaft is rendered parallel with the inclined surface of the disk D, but the optical pickup 1 is displaced to be located excessively close to the disk as shown by a one-dot chain line in FIG. 4 which is a conceptual view, the support pin 81 is moved from a position A to a position B in the correction of the displacement of the pickup during the tilting servocontrol so that the angle of the pickup to the disk and the distance between the pickup and the disk are both appropriate.

What is claimed is:

1. A tilting mechanism for an optical pickup unit of an optical information record/playback apparatus, said tilting mechanism comprising:
   a pickup support means for slidably supporting thereon an optical pickup for movement in a radial direction of a disk;
   a movable fulcrum which is movable relative to said pickup support means in a direction parallel to the direction of the sliding of said optical pickup on said pickup support means; and
   means for moving said movable fulcrum to a preset position depending on the position of said optical pickup on said pickup support means, said optical pickup and said pickup support means being tilted about said fulcrum with respect to the disk.

2. A tilting mechanism according to claim 1, wherein the fulcrum is comprised by a support pin which supports the pickup support means; and the fulcrum moving means comprises a pinion coupled to said pin, a first rack attached to the optical pickup and engaged with said pinion, and a second rack attached to said support means and engaged with said pinion; wherein said pinion is rotated by said first rack along with the sliding of said pickup such that said pin is moved in dependence on the sliding of said pickup.

3. A tilting mechanism for an optical pickup unit of an optical information record/playback apparatus, said tilting mechanism comprising:
   a pickup support means for slidably supporting thereon an optical pickup for movement in a radial direction of a disk;
   a movable fulcrum which is movable relative to said pickup support means in a direction parallel to the direction of the sliding of said optical pickup on said pickup support means; and
   means for moving said movable fulcrum based on the DC component of a focusing error signal, said fulcrum being moved in such a direction as to decrease the DC component of said focusing error;
   wherein said optical pickup and said pickup support means are tilted about said fulcrum with respect to said disk.

4. A tilting mechanism for an optical pickup unit of an optical information record/playback apparatus, said tilting mechanism comprising:
   a pickup support means for slidably supporting an optical pickup for movement in a radial direction of a disk;
   a movable fulcrum which is movable in a direction parallel to the direction of the sliding of said optical pickup on said pickup support means; and
   means for moving said movable fulcrum to a preset position depending on the position of said optical pickup on said pickup support means, said optical pickup and said pickup support means being tilted about said fulcrum with respect to the disk, wherein the fulcrum is comprised by a support pin which supports the pickup support means; and the fulcrum moving means comprises a pinion coupled to said pin, a first rack attached to the optical pickup and engaged with said pinion, and a second rack attached to said support means and engaged with said pinion; wherein said pinion is rotated by said first rack along with the sliding of said pickup such that said pin is moved in dependence on the sliding of said pickup.

5. A tilting mechanism for an optical pickup unit of an optical information record/playback apparatus, said tilting mechanism comprising:
   a support member for supporting an optical pickup unit;
   a slide member for slidably supporting said support member for movement in a radial direction of a disk;
   a movable fulcrum which is movable in a direction parallel to the direction of the sliding of said optical pickup unit;
   a rocking member for rockably supporting said slide member about said movable fulcrum; and
   means for moving said movable fulcrum to a preset position depending on the position of said optical pickup unit.

* * * * *